US008582475B1

(12) United States Patent  
Marghescu et al.

(10) Patent No.: US 8,582,475 B1  
(45) Date of Patent: Nov. 12, 2013

(54) SYSTEM AND METHOD FOR BLENDED PSTN AND COMPUTER NETWORK CUSTOMER SUPPORT INTERACTIONS

(71) Applicant: Google Inc., Mountain View, CA (US)

(72) Inventors: Silviu Cristian Marghescu, Palo Alto, CA (US); Juan Vasquez, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/664,179

(22) Filed: Oct. 30, 2012

(51) Int. Cl.
*H04L 12/16* (2006.01)

(52) U.S. Cl.
USPC ........... 370/270; 370/271; 370/353; 370/354; 370/395.3; 379/265.09; 379/265.11; 379/265.12; 379/265.13; 379/266.01; 379/266.02; 379/266.03

(58) Field of Classification Search
USPC ......... 370/259, 260, 261, 270, 271, 352, 353, 370/354, 395.2, 395.21, 395.3; 379/265.01, 379/265.02, 265.09, 265.11, 265.12, 379/265.13, 266.01, 266.02, 266.03; 709/203, 205
See application file for complete search history.

(56) References Cited

U.S. PATENT DOCUMENTS

| | | | |
|---|---|---|---|
| 6,256,512 B1 | 7/2001 | Verdonk | |
| 6,404,747 B1* | 6/2002 | Berry et al. | 370/270 |
| 6,668,276 B1* | 12/2003 | Ohkado et al. | 709/217 |
| 7,092,509 B1* | 8/2006 | Mears et al. | 379/266.01 |
| 7,103,171 B1 | 9/2006 | Annadata et al. | |
| 7,519,665 B1* | 4/2009 | Shimada et al. | 709/206 |
| 7,689,712 B2 | 3/2010 | Lee et al. | |
| 7,912,208 B1* | 3/2011 | Scott et al. | 379/265.09 |
| 8,229,414 B1 | 7/2012 | Hilyard et al. | |
| 2002/0062347 A1* | 5/2002 | Low et al. | 709/204 |
| 2003/0235288 A1* | 12/2003 | McCormack | 379/265.02 |
| 2004/0165715 A1* | 8/2004 | Scott et al. | 379/265.02 |
| 2009/0182560 A1 | 7/2009 | White | |

OTHER PUBLICATIONS

*Cisco CallManager System Guide*, "Understanding Video Telephony," Chapter 40, undated, 14 pp., accessed Oct. 26, 2012 at http://www.cisco.com/en/US/docs/voice_ip_comm/cucm/admin/4_0_1/ccmsys/a08video.html.

* cited by examiner

*Primary Examiner* — Alvin Zhu
(74) *Attorney, Agent, or Firm* — Leydig, Voit & Mayer, Ltd.

(57) ABSTRACT

The present disclosure includes a system and method for blended telephone network and computer network customer support interactions. The system may include a web server, one or more controllers, a telephone exchange, a monitoring server, and one or more client devices. The method may include receiving a multimedia support request, establishing a multimedia communications session, instructing a telephony application associated with the multimedia communications session to place a telephone call, routing and connecting the telephone call to an available endpoint, identifying the available endpoint when the telephone call is connected to the available endpoint, and transmitting an invitation to participate in the multimedia communications session to the available endpoint.

20 Claims, 11 Drawing Sheets

US 8,582,475 B1

SYSTEM AND METHOD FOR BLENDED PSTN AND COMPUTER NETWORK CUSTOMER SUPPORT INTERACTIONS

BACKGROUND

Conventional contact centers, which are examples of a point-of-contact (POC) for a customer seeking assistance for a product or service, generally rely on traditional communication systems connected by the public switched telephone network (PSTN) to interact with customers. Interaction between customers seeking assistance and customer support agents is often limited to communications over standard telephone connections. Thus, customers without access to a telephone connection or desiring multimedia interaction are not accommodated.

More recently, multimedia contact centers that support both systems connected by the PSTN and systems connected by a network of computers, such as the Internet, have been proposed. A customer support agent at a multimedia contact center is generally provided with equipment that supports both telephone-based and computer network-based communications. For example, an agent's workspace may be provided with a telephone connected to a private branch exchange (PBX) that receives customer support requests via the PSTN, and a computer connected to a server that receives customer support requests via the Internet. In this example, the agent can provide support over either the telephone or the computer. However, since an agent is generally only able to provide support to one customer at a time, a problem arises when the agent receives simultaneous customer support requests over both telephone and computer. In this example, the agent cannot provide support to both customers, leaving one customer unsatisfied.

Consequently, there is a need for a system and method that supports blended PSTN and computer network, e.g., Internet, customer support interactions while alleviating agent workflow complications. Moreover, there is a need for a system and method that supports blended PSTN and computer network customer support interactions with intelligent routing of customer support requests to available agents.

SUMMARY

An embodiment disclosed herein describes a system, e.g., contact center, comprising a web server configured to receive a multimedia support request from a requesting client device and establish a multimedia communications session with the requesting client device at a particular address; a first controller configured to generate a room identifier associated with the multimedia support request and instruct the web server to transmit an invitation to the requesting client device for the requesting client device to join the multimedia communications session at the particular address; a second controller configured to instruct a telephony application to place a proxy telephone call, after the requesting client device accepts the invitation in association with the multimedia communications session, to a telephone exchange and, after the proxy telephone call has passed through a joint queue configured to accept proxy and non-proxy service telephone calls, route the proxy telephone call to an available agent client device; and a monitoring server configured to monitor the telephone exchange and report, to the first controller, routing of the proxy telephone call to the available agent client device, the first controller further configured to transmit a message including the room identifier to the available agent client device in response to the report from the monitoring server, wherein the available agent client device is configured to connect to the multimedia communications session at the particular address, and audio is exchanged between the requesting client device and the agent client device via at least one of the proxy telephone call and the multimedia communications session.

In some embodiments, the contact center further includes an automated contact center resource, associated with the multimedia communications session, configured to determine a specific skill necessary to resolve the multimedia support request; a first table, at the first controller, associating a skill-specific telephone number with the specific skill; and a second table, at the first controller, associating the room identifier with the skill-specific telephone number. The automated contact center resource may include an interactive voice response unit.

The telephony application may place the proxy telephone call, through the PSTN, to the skill-specific telephone number corresponding to the specific skill necessary to resolve the multimedia support request, the monitoring server may report an agent identifier, corresponding to the available agent client device, and the skill-specific telephone number to the first controller, and the first controller may transmit the message including the room identifier based on the second table.

The specific skill may be one of a plurality of skills associated with the contact center, the skill-specific telephone number may be one of a plurality of skill-specific telephone numbers, the first table associating each of the skill-specific telephone numbers with one of the skills associated with the contact center, and the joint queue may be one of a plurality of queues, each queue being associated with one of the skills associated with the multimedia contact center and temporarily storing calls for routing to available agent client devices.

In some embodiments, the contact center further includes a first table associating a new proxy identifier, generated by the first controller, with the room identifier, wherein the telephony application may place the proxy telephone call to the telephone exchange using the new proxy identifier. Caller identification for the proxy telephone call may be set to the new proxy identifier. The new proxy identifier may be generated randomly.

The telephony application may place the proxy telephone call to the telephone exchange using the proxy identifier as caller identification, the monitoring server may identify and report the new proxy identifier along with an agent identifier identifying the available agent client device to the first controller, and the first controller may associate the agent identifier to the room identifier using the first table.

Another embodiment describes a contact center supporting both web and telephone originating support requests comprising a telephone exchange configured to receive a plurality of customer telephone calls for support requests from requesting client telephone devices; a web server configured to receive a plurality of multimedia support requests from requesting client data devices; a first controller configured to generate a room identifier associated with each multimedia support request and instruct the web server to transmit an invitation to the requesting client data device associated with the multimedia support request, wherein a multimedia communications session at a particular address is established by the web server for each requesting client data device when the requesting client data device accepts the invitation; a second controller configured to instruct a telephony application to place proxy telephone calls, as proxies for each multimedia communications session, to the same telephone exchange that receives customer telephone calls from client telephone devices, the proxy telephone call being received by the telephone exchange and being identifiable as associated with a particular multimedia session; and a joint queue configured to receive both the customer telephone calls and the proxy telephone calls, and after each of the customer and proxy telephone calls has passed through the queue, the telephone exchange configured to route and connect each of the customer and proxy telephone calls to an available agent client device.

In some embodiments, the contact center further includes a monitoring server configured to monitor the telephone exchange and report, to the first controller, connection of each proxy telephone call to an agent client device, the first controller configured to transmit a message including the room identifier to the agent client device in response to the report from the monitoring server, wherein the agent client device is configured to connect to the multimedia communications session at the particular address via the message. Each proxy telephone call may include information associating the proxy telephone call with its associated multimedia communications session.

Another embodiment describes a method at a multimedia contact center comprising receiving a multimedia support request; generating a session identifier associated with the multimedia support request; transmitting an invitation, including the session identifier, to participate in a multimedia communications session; establishing the multimedia communications session at a particular address based on acceptance of the invitation; instructing a telephony application associated with the multimedia communications session to place a telephone call; receiving the telephone call at an exchange; routing and connecting the telephone call by the exchange to an available endpoint after it has passed through a queue with other calls; monitoring the exchange to identify the available endpoint when the telephone call is connected to the available endpoint; and transmitting a second invitation, including the session identifier, to participate in the multimedia communications session to the available endpoint.

In some embodiments, the method may further include determining a specific skill necessary to resolve the multimedia support request; determining a skill-specific telephone number associated with the multimedia contact center based on the specific skill; associating the session identifier with the skill-specific telephone number; placing the telephone call, through the PSTN, to the skill-specific telephone number corresponding to the specific skill necessary to resolve the multimedia support request; determining an endpoint identifier of the available endpoint connected to the telephone call to the skill-specific telephone number; and associating the session identifier with the endpoint identifier based on the skill-specific telephone number.

The specific skill may be one of a plurality of skills associated with the multimedia contact center, the skill-specific telephone number may be one of a plurality of skill-specific telephone numbers associated with the multimedia contact center, and the queue may be one of a plurality of queues, each queue being associated with one of the skills associated with the multimedia contact center and configured to temporarily store endpoint identifiers corresponding to available endpoints configured to resolve multimedia support requests.

In some embodiments, the method further includes associating a new caller identifier with the session identifier; and placing the telephone call to the exchange using the new caller identifier. Some embodiments of the method include generating the new caller identifier by spoofing a known telephone number associated with the multimedia contact center. Some embodiments of the method include generating the caller identifier randomly.

In some embodiments, the method further includes placing the telephone call, through the PSTN, to the exchange using the new caller identifier; identifying the new caller identifier when the telephone call is received at the exchange; determining an endpoint identifier of the available endpoint when the telephone call is connected to the available endpoint; and associating the session identifier with the endpoint identifier based on the new caller identifier.

In some embodiments, the method further includes placing the telephone call, through the Internet, to the exchange using the new caller identifier; identifying the new caller identifier when the telephone call is received at the exchange; determining an endpoint identifier of the available endpoint when the telephone call is connected to the available endpoint; and associating the session identifier with the endpoint identifier based on the new caller identifier.

DETAILED DESCRIPTION OF EXAMPLE EMBODIMENTS

Example embodiments include a system and method for blended PSTN and Internet customer support interactions that alleviates agent workflow complications. Further, embodiments include a system and method that supports blended PSTN and computer network customer support interactions providing intelligent routing of customer support requests to available agents. In an example embodiment, a contact center receives customer support requests connecting through the PSTN and/or the Internet.

A multimedia communications session (e.g., a Google+ Hangout) is hosted by a web server or the like at the contact center for customer support requests originating over the web or Internet. A telephony application, executing in association with the hangout, places a proxy telephone call to the contact center. The proxy telephone call may be utilized as a place holder. The contact center routes the proxy telephone call to an available agent (i.e., to the agent's workstation). Thereafter, the contact center associates the agent with the hangout that initiated the proxy telephone call and invites the agent to join the hangout. In this embodiment, both connections (PSTN and Internet) of the agent's workstation are occupied (unavailable) once the agent is connected to the hangout. Thus, the agent is not available to receive separate customer support requests over the plural connections. Additional examples and embodiments are described in the discussion that follows.

An example multimedia communications environment is described in detail with respect to FIGS. 1-5. The illustrated environment is presented as an example, and does not imply any limitation regarding the use of other group networking environments. To the contrary, the description contemplates all implementations of multimedia communications environments that route external multimedia resources into and out of multimedia communications sessions in the multimedia communications environment.

Figure 1:
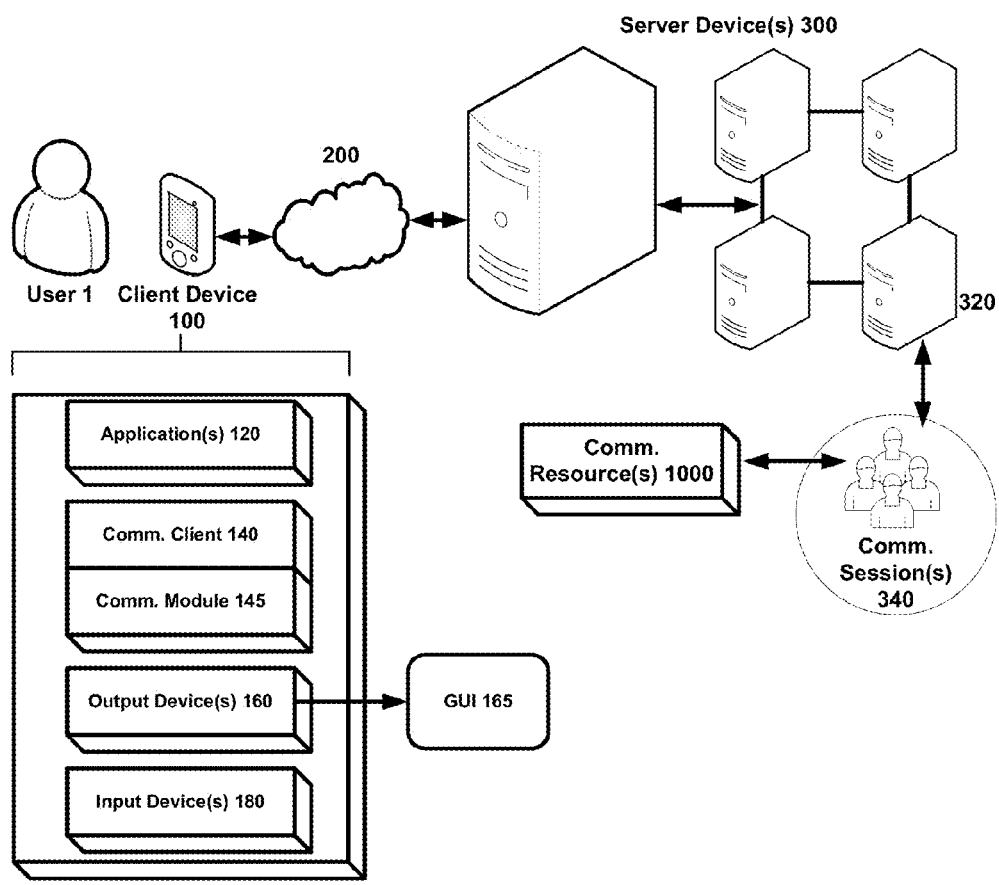
FIG. 1 is a block diagram of an example system supporting multimedia communications environment, including a client device interacting through a communications session hosted by a server device.

Turning to FIG. 1, one or more example client devices 100 are connected to a communications session supporting multimedia communications that enable communication among various client devices and/or resources. Examples of client devices 100 include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, a client device 100 can be a client data device, a client telephone device, or any combination thereof. In some embodiments, two or more client devices of the same type may be connect to a communications session. For example, two mobile telephones may connect to a communications session and interact, e.g., transmit and receive data. In other embodiments, two or more client devices of different type may connect to a communications session. For example, a mobile telephone and a desktop computer may connect to a communications session and interact.

The communications resource(s) 1000 of FIG. 1 may be the same type of devices as client device(s) 100 or may be other communications mechanisms. For example, client device(s) 100 and resource 1000 may both be mobile telephones. In other embodiments, two or more client and resources are different types of devices. For example, client device(s) 100 may be a mobile telephone and resource 1000 may be a desktop computer. In some embodiments, the communications resource(s) 1000 are contact center resources including, but not limited to, Interactive Voice Response (IVR) units or other automated mechanisms.

In the embodiment illustrated by FIG. 1, the client device(s) 100 communicate with a server device(s) 300 via communications path 200 which connects through a communication network. The communications path 200 typically includes an Internet connection or a mobile network connection between the client devices 100 and the server 300. The server 300 often comprises multiple physical servers such as a communications server 320 for maintaining or "hosting" one or more communication sessions, such as communications session(s) 340. In some examples, the communications session 340 is a contact center communications session for providing customer support. Of course, each example server 300 can be a physically separate machine or it can be different processes running within the same physical machine. Additionally, in some embodiments server 300 includes a plurality of interconnected devices maintained at different physical locations.

In one example embodiment, the client device(s) 100 maintain or host a communications session and other clients and/or resources, such as resource 1000 in FIG. 1 are routed to the communication session at the client device(s) 100 by server 300 or the like. In other embodiments, the server devices 300 maintains or hosts one or more communications sessions, e.g., communications session 340.

Communication sessions, such as communications session 340, at the communications server 320 are supported by an environment defined by a runtime engine executing at the server. For example, the runtime engine may be Google's "App Engine." The runtime engine provides the platform for the session and supplies resources required for user interaction. The resources of the application engine are available to the session by way of an application programming interface (API).

The client device(s) 100 of FIG. 1 include application(s) 120, communications client 140, output device 160 (e.g., a display), and input device 180 (e.g., keyboard, mouse, touch screen). Application(s) 120 provide the client device(s) 100 with a variety of functionality. Generally, application(s) 120 employ the output device 160 to display information at a graphical user interface (GUI) 165.

The communications client 140 further includes a communications module 145 that enables the output device 160 to display information at the GUI 165. The communications module 145 also enables the communications client 140 to connect to the communications server 320, allowing the user 1 in FIG. 1 to establish or join a communications session 340 by way of client device(s) 100. Typically, the communications module 145 is a network module that connects the client device(s) 100 to a network such as the Internet using standard network protocol techniques. The communications resource(s) 1000 may also include similar functionality as communications client 140. However, other resources are included in example embodiments. In this manner a client device(s) 100 and multiple potential resource(s) 1000 may join the same communications session 340 hosted at the communications server 320. Through the communications session 340, the communications module 145 at the client device(s) 100 enables the user 1 to reside in a location where other resources may be provided or may be selected to join the session.

Once a communications session 340 is established, a session channel 200 between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device(s) 100. For example, if the client device(s) 100 are mobile devices connecting through to the communications session 340 by way of a bandwidth limited path such as a cellular network, communications server 320 may optimize the number and quality of the audio, video, text, and/or other information sent to client device(s) 100. Furthermore, communications client 140 may dynamically adjust the bit rate required to send the information to communications server 320 by, for example, reducing the quality of the audio, video, text, and/or other information being sent to communications server 320.

The GUI 165 is an illustrative example of a GUI from which a communications session may be initiated and sustained. In the illustrated embodiment, GUI 165 includes information about one or more other resources connected to user 1 by the communications session 340. The GUI may also include information about other resources user 1 may access, notifications of events and other information relevant to user 1.

In some embodiments, in order to establish or join a communications session, user 1 interacts with GUI 165 to cause communications client 140 to generate a request to create a new communications session or join an existing communications session. For an example embodiment including a contact center, the GUI 165 may include a "Get Help" button that user 1 activates in order to create a new contact center communications session. In response to user 1 activating the Get Help button, communications client 140 sends a request to initiate a new communications session 340 to communications server 320, which establishes a new contact center communications session.

As the new session is initiated, various resources, such as resources 1000 in FIG. 1, may be directed to the session as needed without the client device(s) 100 being disconnected or transferred from the communications session. Again, returning to the contact center example, an IVR may be initiated as a resource 1000. The IVR may permit the user 1 to hear communications directed at identifying and solving the help issues identified by the user 1. As the IVR provides its resource, the server 300 and/or other contact center mechanism can receive information that is processed to determine other resources that should be provided to the session to aid in solving the help issues. As the resources are provided, the user 1 is not required to have disruption of service.

In one alternative example embodiment, user 1 may request to join an existing communications session 340. The user 1 may select, e.g., a "join prior session" icon at the GUI 165 and select a session from a displayed list of available sessions at the GUI or selects a "join" icon displayed in an external source such as an instant message or posting. However communicated to the user 1, in response to user 1 initiating an attempt to join an existing session, communications client 140 sends a request to join the communications session to the communications server 320. The request includes an identifier of the particular communications session sought to be joined. The identifier may be included in the join link. Thereafter, the communications server 320 connects communications client 140 to the specified communications session, e.g., communications session 340.

Figure 2:
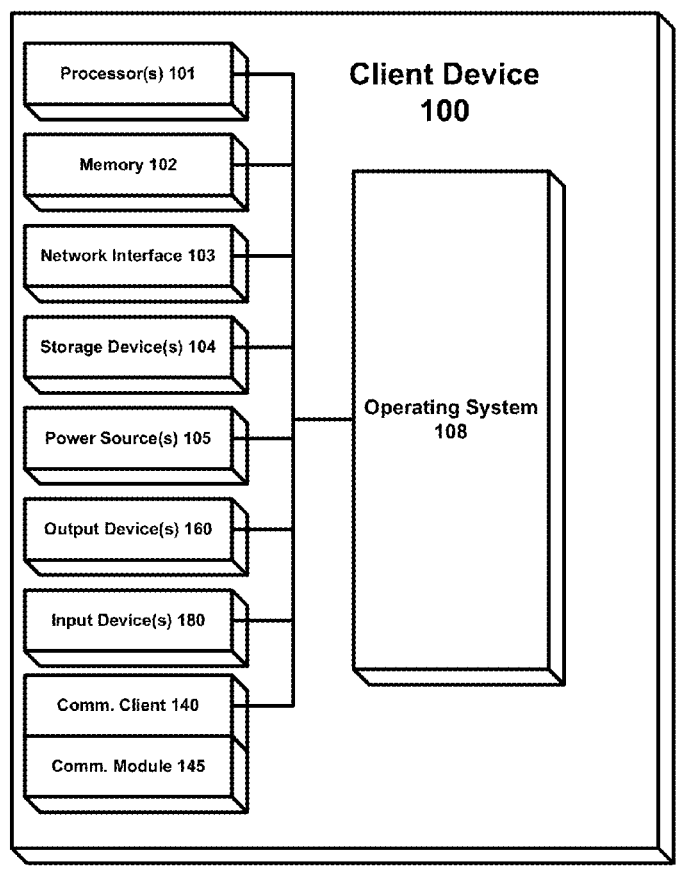
FIG. 2 is a block diagram of basic functional components of the client device in FIG. 1.

Referring now to FIG. 2, one particular example of the client device(s) 100 is illustrated. In general, many other embodiments of the client device(s) 100 may be used as long as they support at least limited participation in communications sessions. In the illustrated embodiment of FIG. 2, the client device(s) 100 includes one or more processor(s) 101, memory 102, a network interface 103, one or more storage device(s) 104, power source 105, output device 160, and input device 180. The client device(s) 100 also includes an operating system 108 and a communications client 140 that are executable by the client. In a conventional fashion, each of components 101, 102, 103, 104, 105, 108, 140, 145, 160, and 180, are interconnected physically, communicatively, and/or operatively for inter-component communications.

As illustrated, the processors 101 are configured to implement functionality and/or process instructions for execution within the client device(s) 100. For example, processors 101 execute instructions stored in memory 102 or instructions stored on storage devices 104. Memory 102, which may be a non-transient, computer-readable storage medium, is configured to store information within client device(s) 100 during operation. In some embodiments, memory 102 includes a temporary memory area for information not to be maintained when the client device(s) 100 is turned off. Examples of such temporary memory include volatile memories such as random access memories (RAM), dynamic random access memories (DRAM), and static random access memories (SRAM). The memory 102 may maintain program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device(s) 100 uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G, 4G, and WiFi® radios in mobile computing devices, and USB. In some embodiments, the client device(s) 100 uses network interface 103 to wirelessly communicate with an external device such as the server 300 of FIG. 1, a mobile phone, or other networked computing device. In some embodiments, the network interface 103 supports wired connections.

The client device(s) 100 includes one or more input device(s) 180. Input device 180 is configured to receive input from a user through tactile, audio, and/or video feedback. Non-limiting examples of input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output device(s) 160 are also included in client device(s) 100. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client device(s) 100 includes one or more power sources 105 to provide power to the client device(s) 100. Non-limiting examples of power source 105 include single-use power sources, rechargeable power sources, and/or power sources developed from nickel-cadmium, lithium-ion, or other suitable material.

The client device(s) 100 includes an operating system 108 such as the Android® operating system. The operating system 108 controls operations of the components of the client device(s) 100. For example, the operating system 108 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client device(s) 100. For example, in one embodiment communications module 145 includes instructions causing the communications client 140 executing on the client device(s) 100 to perform one or more of the operations and actions described in the present disclosure.

In some example embodiments, communications client 140 and/or communications module 145 form a part of the operating system 108 executing on the client device(s) 100. In other embodiments, communications client 140 receives input from one or more of the input devices 180 of the client device(s) 100. Communications client 140 preferably receives audio and video information associated with a communications session 340 from other client devices participating in the communication session.

Figure 3:
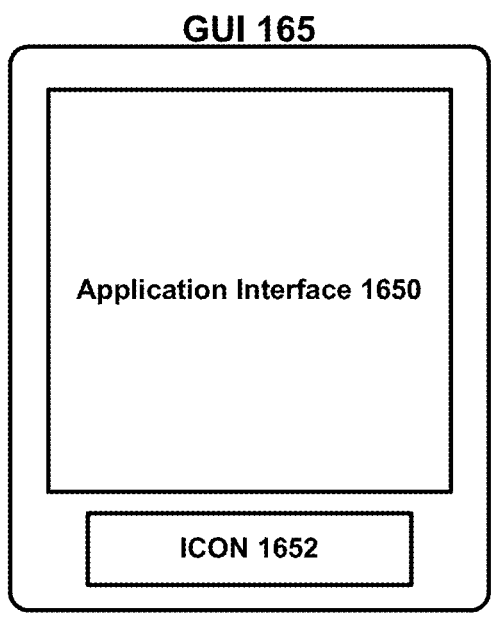
FIG. 3 is an application level block diagram of the client device in FIG. 2, illustrating example executable components supporting, at the client a group interaction experience within the multimedia production environment.

FIG. 3 illustrates an example configuration of the client device(s) 100 when it creates an ambient communications session. The communications module 140 initiates a session from the client device(s) 100 and maintains the session with the communications session 340 at the server 320 while the client performs other tasks. As shown in FIG. 3, GUI 165 displays application interface 1650. Application interface 1650 allows user 1 of FIG. 1 to use and interact with application(s) 120, which in one embodiment can be a internet browser such as Google Chrome®. In some examples, application interface 1650 is a graphical display that is not interactive.

In this example, the communications client 140 causes GUI 165 to display a user-selectable icon 1652. Non-limiting examples of the icon 1652 are a virtual or graphical button, such as a key of a virtual keyboard, a touch-target, a physical button of client device(s) 100, or a button on an input device 180 coupled to client device(s) 100, such as a mouse button, a button on a mobile device, or a key of a keyboard. Of course, GUI 165 may include other graphical controls as well.

Figure 4:
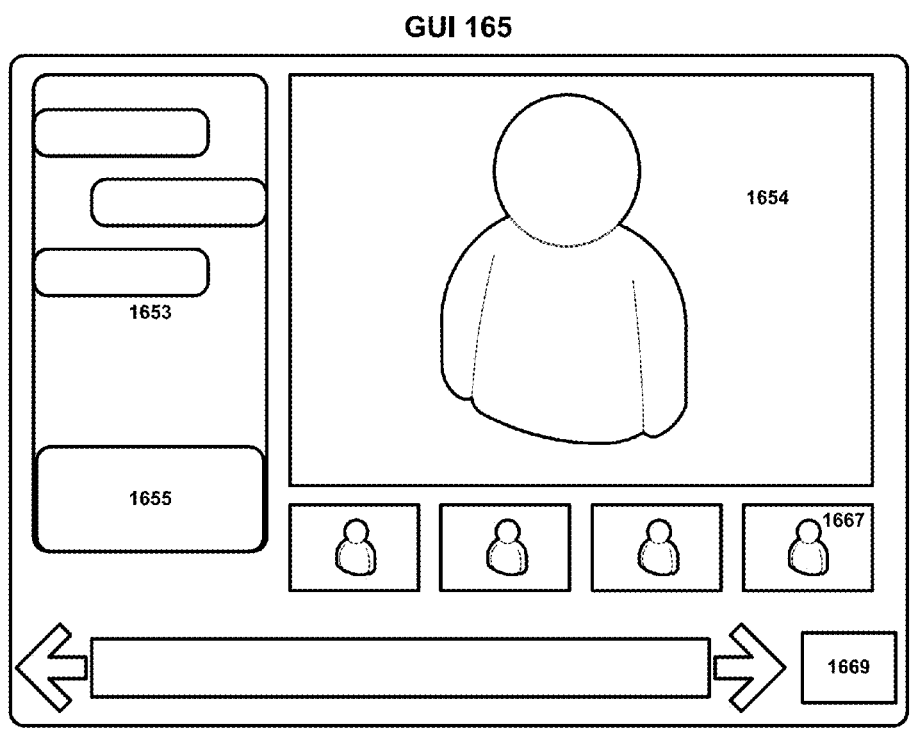
FIG. 4 is an example graphical user interface at the client device of FIGS. 2 and 3 available to a user for a group interaction experience.

The GUI of FIG. 4 is an example of the GUI 165 of client device(s) 100 of FIGS. 1 and 3. However, the graphical display of FIG. 4 may be outputted using other devices. A client application supporting communications sessions is typically web-based contained within an internet browser session. The application exposes a number of features to the user through the GUI. These graphically displayed features include a video display 1654 of one or more resources in the session. A chat feature 1653 is also provided, including a chat history and a field 1655 where a user can input text to the chat conversation. GUI 165 is also configured to display graphical images 1667 that are associated with resources in the session. For example, graphical images 1667 may include images of agents currently participating in a contact center communications session. Exit button 1669 is provided so that the user may terminate the communications session as desired.

Figure 5:
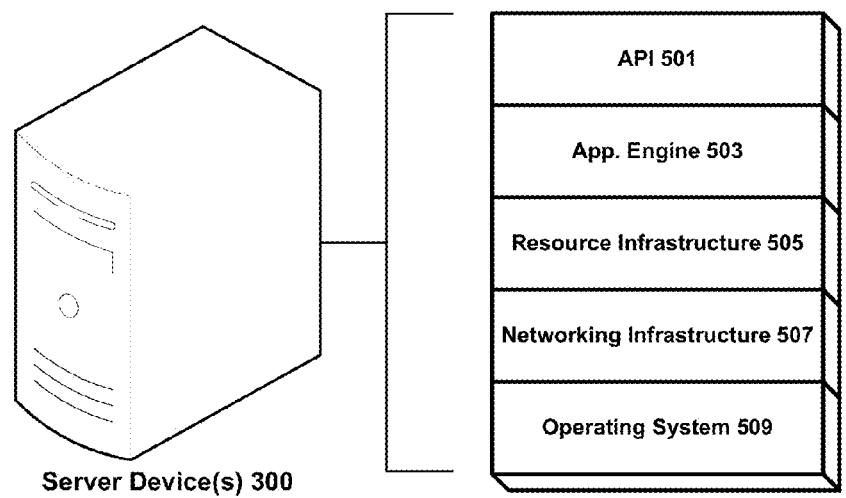
FIG. 5 is a block diagram of an application at the server of FIG. 1 that supports the multimedia communications environment and interaction among client devices through their respect graphical user interfaces.

FIG. 5 is an example block diagram of an application at the server 300 of FIG. 1 that supports the multimedia communications environment and interaction among client devices through their respect graphical user interfaces. Referring to FIG. 5, in one embodiment, an application programming interface (API) 501 of an Application Engine or App Engine 503 provides many resources to the communications session 340. In turn, the App Engine 503 depends on resources provided from an API exposed by an Resources Infrastructure Layer 505 and a Networking Layer 507, which are supported by the server 300 and their Operating Systems 509. The App Engine 503 and the Resource Infrastructure Layer 505 connect requests, e.g., HTTP, from the user to the communications sessions, such as communications session 340. The App Engine 503 also provides a runtime environment for the communications sessions. Administrative support for the communications sessions are provided by the a mechanism in the App Engine 503. The App Engine 503 also provides access to a database in the Resource Infrastructure Layer 505 for persistent storage requirements of the communications sessions.

Through its API 501, the App Engine 503 provides the communications sessions access to resources on the Internet, such as web services or other data. The App Engine 503 retrieves web resources using the Resource Infrastructure Layer 505. The communications sessions also send and receive messages using the App Engine 503 and the Resource Infrastructure Layer 505. The App Engine 503 and the Resource Infrastructure Layer 505 also supports a cache, which is useful for temporary data or data copied from the datastore to the cache for high speed access. The Resource Infrastructure Layer 505 also supports a file system and scheduling resources. An example of the App Engine is Google's App Engine. An example of the Resource Infrastructure Layer 505, the Networking Infrastructure 507 and the Operating System 509 is Google's supporting infrastructure and operating system for its App Engine.

Figure 6:
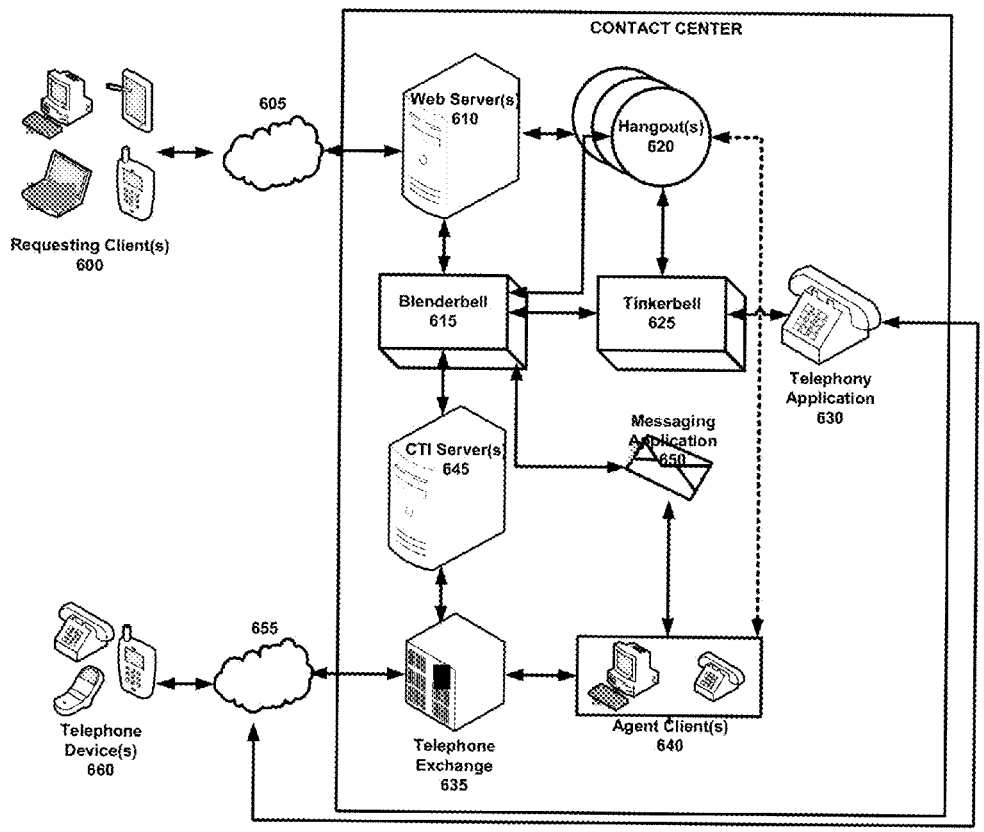
FIG. 6 is a block diagram illustrating an example multimedia contact center supporting blended PSTN-based and Internet-based customer support interactions.

FIG. 6 is a block diagram illustrating an example multimedia contact center supporting blended PSTN and Internet customer support interactions. The contact center of FIG. 6 includes one or more web servers 610, Blenderbell 615, Tinkerbell 625, the telephony application 630, the telephony exchange 635, one or more Computer Telephony Integration (CTI) servers 645, and the messaging application 650. The contact center also includes one or more agent client devices 640 (e.g., endpoints) for customer support agents to use while interacting and resolving customer support requests. Each of Blenderbell 615, Tinkerbell 625, the telephony application 630, and the messaging application 650 may be implemented in hardware, in software, or in a combination of hardware and software. In some embodiments, at least one of Blenderbell 615, Tinkerbell 625, the telephony application 630, and the messaging application 650 is a component of or resides on a server, such as the server(s) 300 of FIG. 1, the web servers 610, and the CTI servers 645. Blenderbell 615 and/or Tinkerbell 625 may be processors, controllers, control applications, and the like.

In the embodiment illustrated in FIG. 6, the contact center supports one or more requesting client devices 600 (e.g., endpoints) that may connect to the web server 610 by the communications pathways 605 through a communication network. The requesting client devices 600 may be embodied by any of the numerous client devices described above with respect to FIGS. 1-5. Likewise, the agent client devices 640—which may be used by customer support agents to connect to and interact with the requesting client devices 600—may be embodied by any of the numerous client devices described above with respect to FIGS. 1-5. Additionally, a customer support agent may employ more than one agent client device 640, e.g., a telephone and a desktop computer, to resolve a support request. In this embodiment, the communications pathways 605 includes the Internet, however it is not limited thereto. The communications pathways 605 may be achieved by any computer-based network. In some embodiments, the communications link is analogous to the communications channel 200 of FIG. 1.

The web server 610 may be analogous to the server 300 of FIG. 1. Thus, as previously described, the web server 610 often comprises multiple physical servers (e.g., communications server 320 of FIG. 1) for maintaining or "hosting" one or more communication sessions (e.g., contact center communications session 340 of FIG. 1). In the embodiment illustrated in FIG. 6, the web server 610 host one or more hangouts 620. As described above, a hangout 620 is a communications session that can support multimedia interactions. Each server 610 can be a physically separate machine or it can be different processes running within the same physical machine. Additionally, while depicted as a single device in FIG. 6, in some embodiments web server 610 includes a plurality of interconnected devices maintained at different physical locations. As mentioned, the web server 610 can connect to one or more client devices—such as requesting client devices 600—over communications pathways 605.

The contact center of FIG. 6 includes Blenderbell 615, which connects to and interacts with the web servers 610, the hangouts 620, Tinkerbell 625, the CTI servers 645 and the messaging application 650. Blenderbell 615 may control many of the processes occurring at the contact center including that, when a customer support request is received by the web server 610 via communications pathways 605, Blenderbell 615 generates a session identifier (such as a Uniform Resource Locator (URL) and/or a Jabber ID (JID)) for a new multimedia communications session (such as a hangout 620) where a requesting client device 600 and an agent client device 640 can ultimately interact. Blenderbell 615 instructs the web server 610 to generate, based on input or requests from the requesting client device 600, the new session. In some cases, a requesting client device 600 indicates a need for customer support which is communicated through the web server to Blenderbell 615. Blenderbell 615 then instructs the web server 610 to issue an invitation to the requesting client device 600 to join an hangout 620 which is completed upon the acceptance of the invitation. In an alternative, the hangout 620 may be established before the invitation is sent. Additionally, Blenderbell 615 may interact with and instruct other contact center resources, such as an IVR, to connect to established hangouts to help resolve customer support requests. When the requesting client device 600 connects to the hangout 620, it will await other resources to join the hangout 620, such as the agent client device 640.

FIG. 6 also includes Tinkerbell 625. In this embodiment, Tinkerbell 625 connects to and interacts with Blenderbell 615, the handouts 620 hosted by the web servers 610, and the telephony application 630. In some embodiments, Tinkerbell 625 is a bridge between the hangouts 620 and the telephony application 630, managing and executing certain tasks that facilitate interaction between the hangouts 620 and the telephony application 630. Tinkerbell 625 may support one or more protocols—e.g., Real-time Transport Protocol (RTP), Session Initiation Protocol (SIP), H.323—to facilitate communications. In the embodiment illustrated by FIG. 6, Tinkerbell 625 receives and executes instructions transmitted from Blenderbell 615.

The telephony application 630 of FIG. 6 is associated with one or more hangouts 620 via Tinkerbell 625. In some embodiments, the telephony application 630 can place a proxy telephone call that reaches and connects through the PSTN via communications pathways 655 while associated with a hangout 620. In this embodiment, the telephony application 630 supports audio based communications through the PSTN at the hangout 620 serving as a proxy for the hangout 620. In other embodiments, the telephony application 630 can place a telephone call that reaches and connects through the Internet while associated with a hangout 620 and can support audio based communications through the Internet at the hangout 620, e.g., Voice over IP (VoIP) serving as a proxy for the hangout. The telephony application 630 may support one or more protocols—e.g., RTP, SIP, H.323—to facilitate communications. Google Voice is a non-limiting example of a telephony application 630 that can associate with a hangout 620. The telephone call placed by the telephony application 630 connects to the telephone exchange 635 through communication pathways 655 and a communications network. The communication networks may be any form of communication network including for example PSTN, Internet VoIP, PBX, etc.

The contact center of FIG. 6 also includes a telephone exchange 635, which is configured to connect with one or more telephone devices 660 over the communications pathways 655 through communication networks. In some embodiments, the communications pathways 655 form a link connected by the PSTN. In other embodiments, the communications pathways 655 may be any link connected by the Internet. The telephone exchange 635 may be a PBX, a softswitch, or the like. In FIG. 6, the telephone exchange 635 connects to and interacts with agent client devices 640. For example, upon receiving a telephone call over the communications pathways 655, the telephone exchange 635 can identify an agent client device 640 that is available to and capable of resolving the customer support request associated with the telephone call, and subsequently route and connect the telephone call to the available agent client device 640. The telephone exchange 635 may support one or more protocols—e.g., RTP, SIP, H.323—to facilitate connections and communications.

Figure 11:
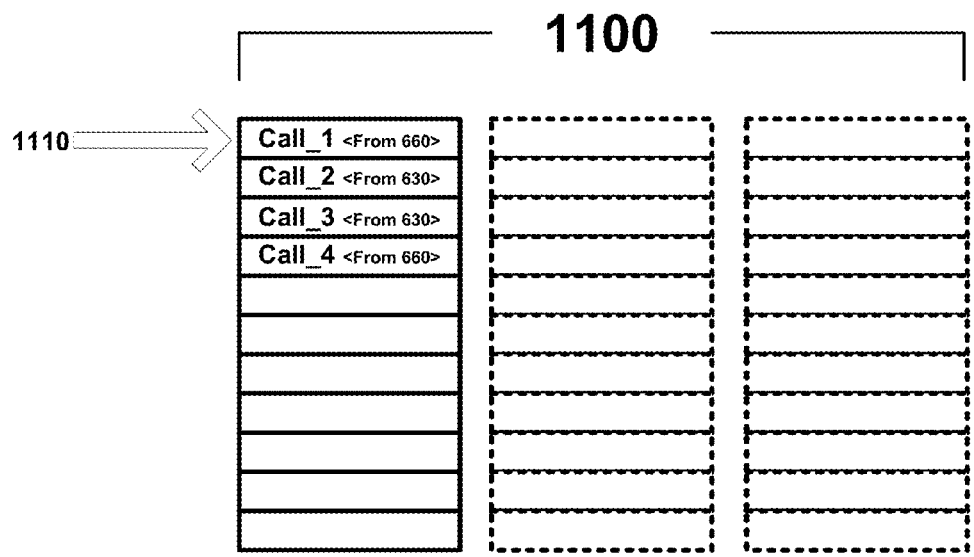
FIG. 11 is a block diagram illustrating one or more joint queues for storing information prioritizing telephone calls placed from various sources.

The telephone exchange 635 may include one or more joint queues or buffers that store information prioritizing the telephone calls placed from client devices 660 or telephony application 630. Since the queues join the calls from both sources, the joint queues permit the coordinated prioritization and processing of the hangout 620 based multimedia requests and the non-web requests originating from client devices 660. The telephone calls from telephony application 630 may act as a proxy in this manner for processing through the queue leading to an agent client device 640 connecting to the hangout 620, either through Tinkerbell 625 and telephony application 630 and/or directly to the hangout 620 through a data connection. FIG. 11 is an example of one or more joint queues 1100, that may be included at the telephone exchange 635, for storing information prioritizing the telephone calls placed from client devices 660 or telephony application 630. Joint queues may temporarily hold telephone calls placed from client device 660 or telephony application 630 until an agent is available to provide customer support. In some embodiments, the joint queues 1100 prioritize telephone calls based on the time the call was received by the telephone exchange 635, using a first-in-first-out (FIFO) method, etc. In FIG. 11, arrow 1110 points to the next telephone call to be routed to an available agent. Of course, any conceivable method of prioritizing telephone calls in the joint queue may be used. Additionally, in some embodiments, each joint queue may be associated with a specific skill set needed to resolve the customer support request. For example, one joint queue may be associated with telephone calls placed from various sources requesting support from an engineering department, while another joint queue be associated with phone calls requesting support from a legal department.

Additionally, the telephone exchange 635 may include one or more buffers or queues for storing information identifying agent client devices 640 (e.g., agent identifiers) that are available to provide customer support. In some embodiments, agent identifiers are added to a buffer or queue when an agent client device 640 becomes available to provide support, and are removed from a buffer or queue when the telephone exchange 635 connects the agent client device 640 to a customer support request, i.e., becomes unavailable to provide further support. A queue or buffer may function in a first-in-first-out (FIFO) method.

Figure 7:
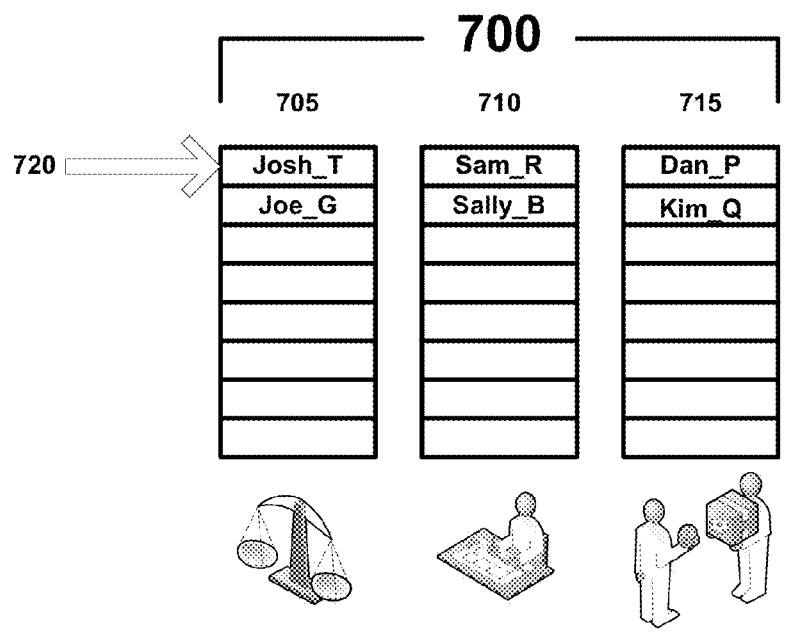
FIG. 7 is a block diagram illustrating example queues for identifying available customer support agents associated with the multimedia contact center of FIG. 6.

Each buffer or queue may be associated with a specific customer support skill set. Thus, customer support requests requiring a specific skill set to resolve the service request can be routed to an agent possessing the required skill set by matching the requested service with the appropriate queue. As an example, an agent identifier at the "top" of the queue indicates the next agent client device to be connected to an incoming call requiring the specific skill set associated with the queue. FIG. 7 depicts a non-limiting example of the queues 700 that may be included in the telephone exchange 635. In the example of FIG. 7, the telephone exchange 635 includes separate queues 700 for storing agent identifiers for agents skilled in resolving legal 705, technical 710, and financial 715 customer support requests. The pointer 720 indicates the next available agent in a particular queue. The queues described in this example are not intended to be limiting, thus, any number of queues may be maintained for any desired department or skill set. The queues 700 of FIG. 7 may be used in combination with one or more joint queues, such as the joint queues 1100 of FIG. 11, to route telephone calls to available customer support agents.

Returning to FIG. 6, the contact center also includes one or more CTI servers 645. The CTI servers 645 are connected to and interact with the telephone exchange 635 and Blenderbell 615. In the embodiment depicted by FIG. 6, the CTI servers 645 monitor the telephone exchange 635. For example, the CTI servers 645 can monitor the connections established by the telephone exchange 635. In an alternative embodiment, the CTI servers 645 include one or more buffers or queues for storing information identifying available agent client devices 640 or telephone calls in accordance with the description above, including the description of FIG. 7. As telephone calls are connected to agents, the CTI server 645 informs Blenderbell 615 of the event. Individually or in combination, the telephone exchange 635, the CTI server 645 and/or Blenderbell 615 distinguishes telephone calls originating from telephone devices 660 and telephony application 630. The telephone calls from client devices 660 are permitted to connect to agent client devices without the need for messaging action to occur. When a proxy telephone call is connected to agent client device 640, it is identified by data information carried with the call. In the case of a PSTN call, the information may be in any permitted form such as callerID, Automatic Number Identification (ANI), etc. In the case of a VoIP call, the information may be in any permitted form, such as header data, meta data, etc.

As mentioned above, such information is maintained when the call is first originated. When Blenderbell 615 is informed of the identifying information, it associates the information with the hangout 620 and transmits the information to a messaging application 650. The messaging application 650 subsequently transmits a message, to the agent client device 640 connected to the proxy telephone call, containing the session or room identifier (e.g., URL, JID, and the like) of the hangout 620 associated with the proxy telephone call. Thus, the customer support agent, using the agent client device 640, may connect to the hangout 620 associated with the proxy telephone call by directing a browser or other application to connect to hangout. For example, the agent may direct a browser to the URL of the hangout. In some embodiments, the agent receives audio via the proxy telephone call and may mute or silence any audio transmitted through the hangout 620. In other embodiments, the agent receives audio (as well as other forms of stimuli) via the hangout 620 and may mute or silence audio transmitted through the proxy telephone call. In some embodiments the agent can dynamically change between receiving audio through the proxy telephone call and receiving audio through the hangout 620.

The messaging application 650 in the contact center of FIG. 6 is connected to and interacts with Blenderbell 615 and the agent client devices 640. In this embodiment, the messaging application 650 transmits messages from Blenderbell 615 to the agent client devices 640. The messaging application 650 may support text messaging—such as Short Messaging Service (SMS) and/or Multimedia Messaging Service (MMS)—Email, and the like. In this embodiment, the messaging application 650 transmits the session identifier of a hangout 620 associated with a particular customer support request to an agent client device 640. In some cases, the message is an invitation sent to the email of the agent. Thereafter, the agent client device 640 may connect to the hangout 620 identified by the session identifier. Google Mail or "Gmail" is another non-limiting example of the messaging application 650. In some instances, the invitation must be accepted to establish the connection to the hangout 620, in other cases, the messaging application may be automatically processed by applications at the agent client devices 640 to establish the connection to hangout 620.

Figure 8:
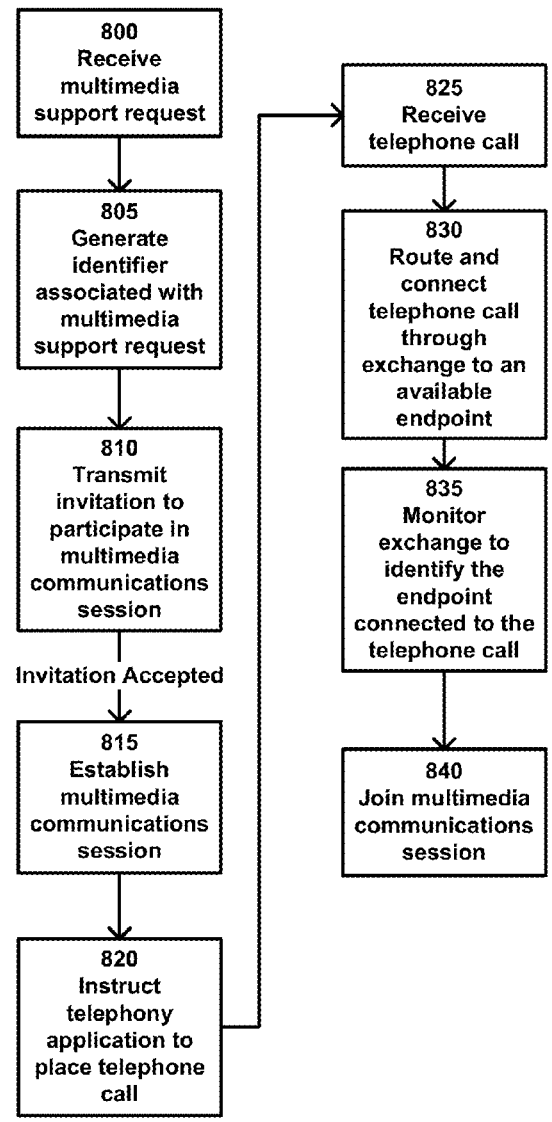
FIG. 8 is a flow diagram of an example method for a blended PSTN and Internet customer support interaction at a multimedia contact center.

FIG. 8 is a flow diagram of an example method for a blended PSTN and Internet customer support interaction at a multimedia contact center. In the discussion that follows, the method of FIG. 8 is described in conjunction with the system of FIG. 6 for illustrative purposes only. Thus, the method of FIG. 8 can be implemented on any appropriate system.

Step 800: Receive Multimedia Support Request.

In step 800, a multimedia contact center, such as the contact center depicted in FIG. 6, receives a customer support request. In this embodiment of FIG. 6, the customer support request transmitted from a requesting client 600 to the web server 610 via the communications pathways 605. The communications pathways 605 may be the Internet, or any other computer-based network.

Step 805: Generate Identifier Associated with Multimedia Support Request.

After the customer support request is received at step 800, the method proceeds to step 805 where an identifier associated with the multimedia support request ("session identifier") is generated. In the embodiment of FIG. 6, the web server 610 communicates reception of the customer support request to Blenderbell 615. Thereafter, Blenderbell 615 generates an identifier—such as a URL or JID—that can be used to identify a multimedia communications session for resolving the customer support request. In this embodiment, the multimedia communications session is a hangout 620. When the identifier is a URL, for example, the identifier may describe a particular location or address of the hangout 620 at the web server 610. The identifier may be a selectable link, e.g., Hypertext Transfer Protocol (HTTP).

Step 810: Transmit Invitation to Participate in Multimedia Communications Session.

After generating the session identifier at step 805, an invitation to participate in the multimedia communications session is transmitted to the source of the customer support request. With respect to the contact center of FIG. 6, Blenderbell 615 passes the generated session identifier to the web server 610. Thereafter, the web server 610 invites the requesting client 600, via communications pathways 605, to participate in a hangout 620. In some embodiments, the invitation is an Email or text message that includes the session identifier of the hangout 620.

Step 815: Establish Multimedia Communications Session.

In the example process of FIG. 8, the multimedia communications session is not established until the source of the customer support request accepts the invitation to participate. Thus, in the contact center of FIG. 6, the web server 610 does not establish a hangout 620 associated with the session identifier until the requesting client 600 accepts the invitation of step 810. In one example, accepting the invitation is effectuated by selecting or directing a web browser to the URL associated with a hangout 620. In alternative embodiment, multimedia communications session may be established before the source of the request accepts the invitation to participate. For example, Blenderbell 615 instructs the web server 610 to establish a hangout 620 associated with an identifier before the requesting client 600 accepts the invitation to the hangout 620. The sequencing of the establishment of the hangout may be variable. For example, the hangout may be established before the invitation is accepted. In some cases, the hangout is completed upon the acceptance of the invitation.

Step 820: Instruct Telephony Application to Place Telephone Call.

Once the multimedia communications session has been established at step 815, a telephony application associated with the multimedia communications session is instructed to place a telephone call to the contact center. Returning to the example of FIG. 6, once a hangout 620 has been established and the requesting client 600 is connected to and able to interact with the hangout 620, the telephony application 630 is instructed to place a telephone call to the contact center via communications pathways 655. In an embodiment, instructing the telephony application 630 is accomplished by Blenderbell 615 identifying and transmitting a telephone number to Tinkerbell 625. Tinkerbell 625, which is associated with the hangout 620 and functions as a bridge between the hangout 620 and the telephony application 630, instructs the telephony application 630 to place the telephone call using the telephone number received from Blenderbell 615. Thereafter, the telephony application 630 uses the telephone number to call the contact center via communications pathways 655.

Step 825: Receive Telephone Call.

At step 825, the contact center receives the telephone call placed in step 820. In the embodiment of FIG. 6, the telephone exchange 635 receives the telephone call placed by the telephony application 630 via the communications pathways 655. As described, the communications pathways 655 may connect devices over the PSTN and/or the Internet.

Step 830: Route and Connect Telephone Call Through Exchange to an Available Endpoint.

After the telephone call is received at step 825, the call is routed and connected to an available endpoint. Returning to the embodiment of FIG. 6, the telephone exchange 635 and/or the CTI server 645 route and connect the telephone call to an available agent client device 640. As described in accordance with FIG. 7, one or more queues may be maintained for storing identifiers indicating agent client devices 640 that are available to provide customer support. As mentioned, each queue may be associated with a specific customer support skill set. A telephone call received by the telephone exchange 635 may be connected to an agent identifier (identifying an available agent client device 640) in a queue associated with a skill set necessary to provide the requested support. In these embodiments, the telephone number dialed by the telephony application 630 at step 820 may indicate a specific queue to route the telephone call through.

Step 835: Monitor Exchange to Identify the Endpoint Connected to the Telephone Call.

In step 835, the exchange is monitored to identify the endpoint that the telephone call is connected with. Referring to the contact center of FIG. 6, the CTI server 645 monitors the telephone exchange 635 to identify the agent client device 640 that is connected to the telephone call in step 830.

Step 840: Join Multimedia Communications Session.

Figure 9:
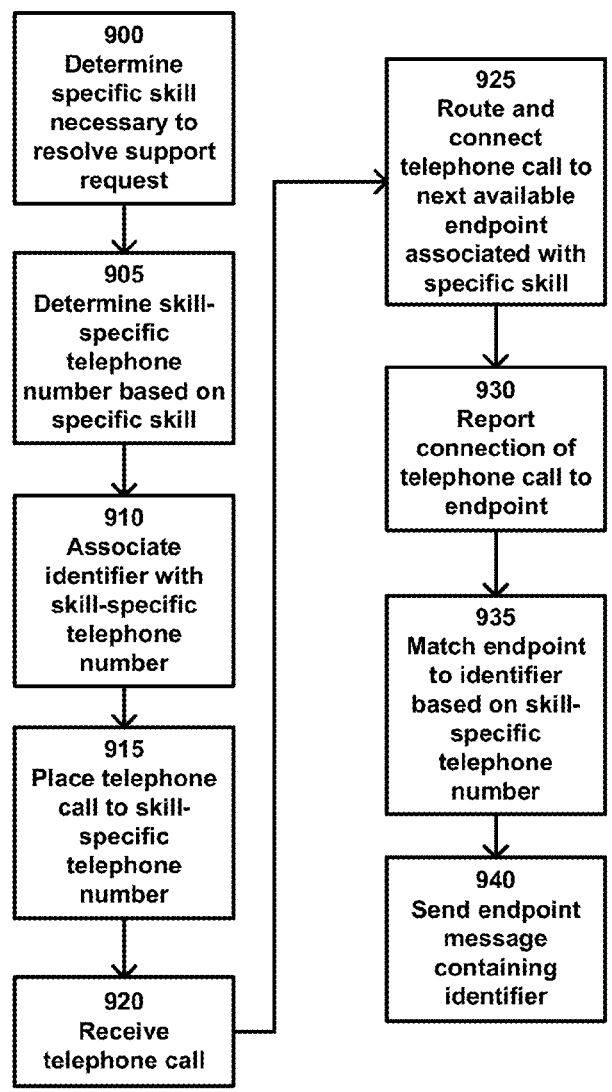
FIG. 9 is a flow diagram of an example method for associating an endpoint, e.g., agent, receiving a telephone call through the PSTN with an existing multimedia communications session associated with the telephone call.
Figure 10:
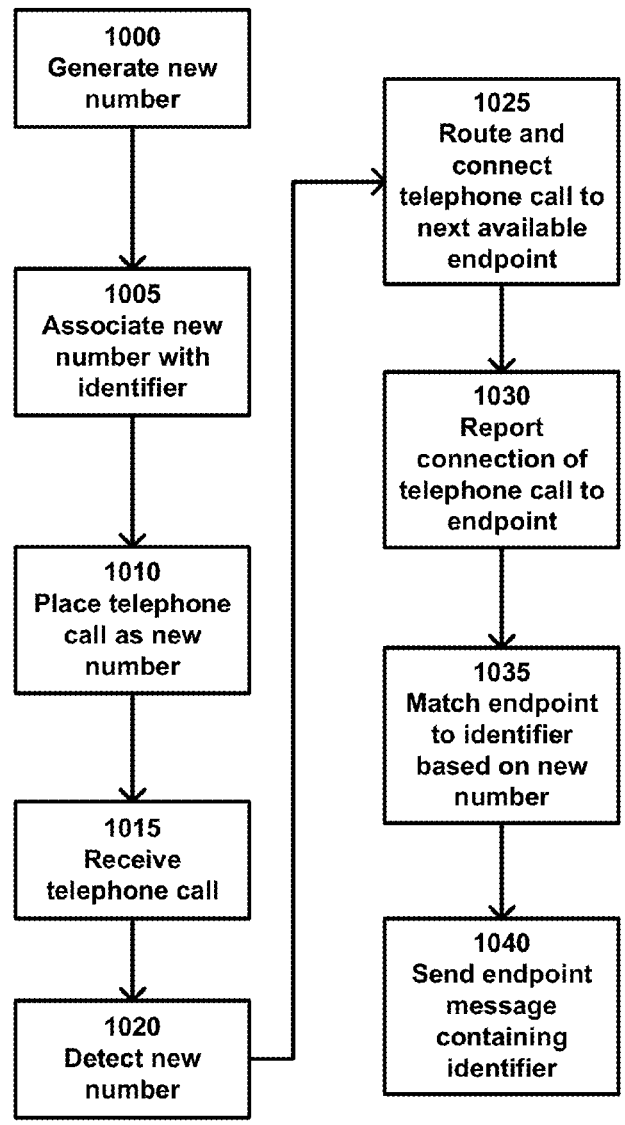
FIG. 10 is a flow diagram of an example method for associating an endpoint, e.g., agent, receiving a telephone call through the PSTN with an existing multimedia communications session associated with the telephone call.

After the endpoint is connected to the telephone call, the endpoint joins the multimedia communications session in step 840. For example, in some embodiments of the contact center of FIG. 6, the CTI server 645 transmits, to Blenderbell 615, the agent identifier associated with the agent client device 640 connected to the telephone call. Thereafter, Blenderbell 615 associates the agent identifier with the hangout 620 established in step 815. For example, Blenderbell 615 may associate the URL of the hangout 620 with the agent identifier received from the CTI server 645. FIGS. 9 and 10 describe example methods of associating an endpoint, e.g., an agent client device 640, receiving a telephone call through the PSTN with a multimedia communications session, e.g., a hangout 620, associated with the telephone call. Thereafter, Blenderbell 615 instructs the messaging application 650 to send a message to the agent client device 640 that received the telephone call, the message containing the session identifier generated in step 805. Once the message is received by the agent client device 640, the agent client device 640 may connect to and participate in the hangout 620 associated with the session identifier.

Alternatively, step 840 may be accomplished by including the session identifier in header information or meta data of the telephone call. For example, in some embodiments of the contact center of FIG. 6, the telephony application 630 supports VoIP and connects to the telephone exchange 635 through the Internet. In these embodiments, the telephony application 630 transmits the session identifier of the multimedia communications session as header information when the telephone call is placed in step 820. For example, a telephony application 630 supporting SIP includes the URL or JID of a hangout 620 in the "FROM" field of the header file. Upon receiving the telephone call including the header information at the telephone exchange 635, the telephone exchange 635 and/or the CTI server 645 can extract and pass the URL or JID of the hangout 620 to the agent client device 640 that received the telephone call at step 830. Thereafter, the agent client device 640 may connect to the hangout 620 associated with the URL or JID. Alternatively, the agent client device 640 may include an application configured to extract the header and/or session identifier, including the URL or JID, of the telephone call received in step 830; allowing the agent client device 640 to connect to the hangout 620 without requiring receipt of a message including the session identifier. In other embodiments, the agent client device 640 may include an application configured to extract metadata of the telephone call that is linked to or indicative of the session identifier. In these embodiments, the agent client device 640 may access a database (e.g., at the web server 610)—storing the association between the metadata and the session identifier—to acquire the session identifier using the extracted metadata.

FIG. 9 is a flow diagram of an example method for associating an endpoint, e.g., customer support agent, receiving a telephone call through the PSTN with an existing multimedia communications session associated with the telephone call.

The method for associating an endpoint with an existing communications session of FIG. 9 may be operated in combination with the method of FIG. 8. Additionally, in the discussion that follows, the method of FIG. 9 is described in conjunction with the system of FIG. 6 for illustrative purposes only. Thus, the method of FIG. 9 can be implemented on any appropriate system.

Step 900: Determine Specific Skill Necessary to Resolve Support Request.

The process begins at step 900 by determining a specific customer support skill set necessary to resolve the customer support request. As an example, the contact center of FIG. 6 may include one or more resources (e.g., communications resource(s) 1000 of FIG. 1) able to extract and/or analyze information about the nature of the support request from the requesting client 600. In some embodiments, the resources are automated machines, such as an IVR. In some embodiments, the resources function based on a predetermined set of business rules. Once the appropriate information about the nature of the support request has been acquired, the request is associated with a specific customer support skill set necessary to resolve the request. Often the specific skill set is only the first or most pertinent skill set needed to resolve the request, and is used in combination with other skill sets to resolve the support request. In some embodiments, the resource is able to determine the specific skill set. In other embodiments, the resource transfers extracted information to Blenderbell 615, and Blenderbell 615 determines the specific skill set. When the method of FIG. 9 operates in combination with the method of FIG. 8, step 900 may occur after the multimedia communications session is established (step 815) and before the telephony application is instructed to place the telephone call (step 820).

Step 905: Determine Skill-Specific Telephone Number Based on Specific Skill.

After the specific contact center skill set is determined in step 900, a skill-specific telephone number is determined. In FIG. 6, Blenderbell 615 and/or the web server 610 maintain(s) a pool of known contact center telephone numbers. Similar to the queues described in FIG. 7, each telephone number in the pool may be associated with a specific customer support skill set. Thus, in this embodiment, a telephone call placed to one of the skill-specific telephone numbers is connected to an agent client device 640 operated by an agent having the specific skill set. For example, it may be determined at step 900 that a customer support request requires engineering skills to resolve the request. In this example, Blenderbell 615 then identifies a telephone number, from the pool of telephone numbers, associated with the engineering department, i.e., the skill-specific telephone number, in step 905. In some embodiments, the telephone numbers in the pool and the specific skill associated therewith are maintained in one of a list, chart, table, or the like that can be accessed by Blenderbell 615, and/or the web server 610, and/or the CTI server 645, and/or the telephone exchange 635. When the method of FIG. 9 operates in combination with the method of FIG. 8, step 905 may occur after the multimedia communications session is established (step 815) and before the telephony application is instructed to place the telephone call (step 820).

Step 910: Associate Identifier with Skill-Specific Telephone Number.

In step 910, an identifier associated with the multimedia communications session ("session identifier") established for the customer support request is associated with the skill-specific telephone number determined in step 905. Generating a session identifier may be accomplished using the techniques described in step 805 of FIG. 8. The generated session identifier is associated with the skill-specific telephone number determined in step 905. In the contact center of FIG. 6, Blenderbell 615 associates the URL or other identifier of a hangout 620 with the skill-specific telephone number of step 905. In some embodiments, Blenderbell 615 maintains or accesses a list, chart, table, or the like of hangout 620 identifiers and associated skill-specific telephone numbers. Again, when the method of FIG. 9 operates in combination with the method of FIG. 8, step 905 may occur after the multimedia communications session is established (step 815) and before the telephony application is instructed to place the telephone call (step 820).

Step 915: Place Telephone Call to Skill-Specific Telephone Number.

At step 915, a telephone call is paced to the skill-specific telephone number. Placing the telephone call of step 915 may be realized using the techniques described with respect to step 820 of FIG. 8. For example, Blenderbell 615 of FIG. 6 transmits the skill-specific telephone number to Tinkerbell 625. Tinkerbell 625 instructs the telephony application 630 to place the telephone call to the skill-specific telephone number received from Blenderbell 615. Thereafter, the telephony application 630 uses the skill-specific telephone number to call the contact center via communications pathways 655. In this embodiment, the communications pathways 655 includes the PSTN.

Step 920: Receive Telephone Call.

At step 920, the contact center receives the telephone call placed in step 915. Receiving the telephone call of step 920 may be realized using the techniques described with respect to step 825 of FIG. 8. For example, the telephone exchange 635 (FIG. 6) receives the telephone call placed by the telephony application 630 via the communications pathways 655.

Step 925: Route and Connect Telephone Call to Next Available Endpoint Associated with Specific Skill.

After the telephone call is received at step 920, the call is routed and connected to an available endpoint associated with the specific skill. Again, step 925 may be realized using the techniques described with respect to step 830 of FIG. 8. Thus, the telephone exchange 635 and/or the CTI server 645 (FIG. 6) routes and connects the telephone call to an available agent client device 640. In this embodiment, the telephone call may be routed to the next available agent client device 640 operated by an agent possessing the specific skill. The telephone call may be routed, based on the skill-specific telephone number, through one of the queues described in accordance with FIG. 7. As described above, one or more buffers or queues may be maintained for storing information agent client devices 640 (e.g., agent identifiers) that are available to provide customer support. In some embodiments, agent identifiers are added to a buffer or queue when an agent client device 640 becomes available to provide support, and are removed from a buffer or queue when the telephone exchange 635 connects the agent client device 640 to a customer support request, i.e., becomes unavailable to provide further support. Each buffer or queue may be associated with a specific customer support skill set. Thus, customer support requests requiring a specific skill set to resolve the service request can be routed to an agent possessing the required skill set by matching the requested service with the appropriate queue. As an example, an agent identifier at the "top" of the queue indicates the next agent client device to be connected to an incoming call requiring the specific skill set associated with the queue. FIG. 7 depicts a non-limiting example of the queues 700 that may be included in the telephone exchange 635. In the example of FIG. 7, the telephone exchange 635 includes separate queues 700 for storing agent identifiers for agents skilled in resolving legal 705, technical 710, and financial 715 customer support requests. The pointer 720 indicates the next available agent in a particular queue. The queues described in this example are not intended to be limiting, thus, any number of queues may be maintained for any desired department or skill set.

Step 930: Report Connection of Telephone Call to Endpoint.

In step 930, the connection of the telephone call to the endpoint is reported. Step 930 may be realized using the techniques described with respect to step 835 of FIG. 8. For example, the CTI server 645 (FIG. 6) monitors the telephone exchange 635 to identify the agent client device 640 that is connected to the telephone call in step 925. Thereafter, the CTI server 645 transmits the agent identifier and the skill-specific telephone number to Blenderbell 615.

Step 935: Match Endpoint to Identifier Based on Skill-Specific Phone Number.

In the event that, the connected call is identified as a proxy call, in step 935, the endpoint that was connected to the telephone call is matched to a multimedia session in hangout 620. In the contact center of FIG. 6, Blenderbell 615 accesses the list, chart, table, or the like associating hangout 620 identifier to skill-specific telephone number and matches the agent identifier to the hangout 620 identifier.

Step 940: Send Endpoint Message Containing Identifier.

In step 940, the endpoint is sent a message containing the session identifier and, thus, may connect to the multimedia communications session. Step 940 may be accomplished using certain techniques described with respect to step 840 of FIG. 8. For example, Blenderbell 615 of FIG. 6 may instruct the messaging application 650 to send a message to the agent client device 640 that received the telephone call, the message containing the session identifier. Once the message is received by the agent client device 640, the agent client device 640 may connect to and participate in the hangout 620 associated with the session identifier. Thus, the agent client device 640 that received the telephone call placed in step 915 is connected to the hangout 620 that initiated the telephone call. Additionally, once the customer support request has been resolved, the skill-specific telephone number may be returned to the pool of telephone numbers to be used again in a subsequent support request.

FIG. 10 is a flow diagram of an example method for associating an endpoint, e.g., agent, receiving a telephone call through the PSTN with an existing multimedia communications session associated with the telephone call. The method for associating an endpoint with an existing communications session of FIG. 10 may be operated in combination with the method of FIG. 8. Additionally, in the discussion that follows, the method of FIG. 10 is described in conjunction with the system of FIG. 6 for illustrative purposes only. Thus, the method of FIG. 10 can be implemented on any appropriate system.

Step 1000: Generate New Number.

The process begins at step 1000 by generating a new number. In some embodiments, the number of digits of the new number is not limited. In the contact center of FIG. 6, the new number may be a telephone number. The new telephone number may be generated randomly, e.g., by using a random number generator, or by spoofing a known telephone number. For example, Blenderbell 615 may generate a new telephone number at any of steps 800, 805, 810, and 815 of FIG. 8.

Step 1005: Associate New Number with Identifier.

In step 1005, the new number is associated with an identifier. In some embodiments, the identifier be a unique identifier associated with a multimedia communications session or session identifier. In these embodiments, the multimedia communications session may be existing and ongoing. Alternatively, the multimedia communications session may not yet be established. Returning to the example contact center of FIG. 6, Blenderbell 615 associates the new telephone number generated in step 1000 with the URL or JID of a hangout 620 established (or to be established) to resolve a customer support request. In this regard, the telephone number and telephone call acts as a proxy for the multimedia session. In some cases, a list, chart, table, or the like that associates the URL and the new telephone number is maintained that can be accessed by Blenderbell 615, and/or the web server 610, and/or the CTI server 645, and/or the telephone exchange 635. The list, chart, table, or the like may be maintained in a computer readable medium.

Step 1010: Place Telephone Call as New Number.

In step 1010, a proxy telephone call is placed that identifies the new number as the calling number. Automatic Number Identification (ANI), caller ID, or the like may be used to realize step 1010. In the contact center of FIG. 6, Blenderbell 615 transmits the new number to Tinkerbell 625. Tinkerbell 625 instructs the telephony application 630 to place a proxy telephone call to the contact center. Thereafter, the telephony application 630 calls the contact center via communications pathways 655. In this some embodiment, the communications pathways 655 includes the PSTN.

Step 1015: Receive Telephone Call.

The proxy telephone call is received at step 1015.

Step 1015 may be realized using the techniques described in step 920 of FIG. 9 and/or step 825 of FIG. 8.

Step 1020: Detect New Number.

In step 1020, the new number is detected, extracted, identified, etc. from the proxy telephone call. ANI, caller ID, or the like may be used to realize step 1020. In the contact center of FIG. 6, the CTI server 645 and/or the telephone exchange 635 may detect the new number from the proxy telephone call.

Step 1025: Route and Connect Telephone Call to Next Available Endpoint.

The proxy telephone call is routed and connected to an available endpoint in step 1025. In the contact center of FIG. 6, the telephone exchange 635 and/or the CTI server 645 routes and connects the telephone call to an available agent client device 640. In this process, the proxy telephone call and telephone calls client devices 660 may be joined into a single or multiple buffers or queues without requiring separate processing. Each telephone call, regardless of its origin as a web-based service request from requesting clients 600 or a telephone request from telephone client devices 660, may be processed in a FIFO or other processing scheme. These calls may be routed through one of the queues, as described in accordance with FIG. 7. In some embodiments, a specific skill is determined (e.g., step 900 of FIG. 9) prior to placing the telephone call, and the telephone call is routed through one of the queues based on a specific skill necessary to resolve the support request.

Step 1030: Report Connection of Telephone Call to Endpoint.

Connection of a proxy telephone call to the available endpoint is reported in step 1030. Step 1030 may be realized using the techniques described in step 930 of FIG. 9 and/or step 835 of FIG. 8. For example, the CTI server 645 (FIG. 6) monitors the telephone exchange 635 to identify the agent client device 640 that is connected to the telephone call in step 1025. Thereafter, the CTI server 645 transmits the agent identifier and the new number to Blenderbell 615.

Step 1035: Match Endpoint to Identifier Based on New Number.

In step 1035, the endpoint that was connected to the telephone call is matched to the session identifier via the new number. Recall that the session identifier is associated with the new number in step 1005. In the contact center of FIG. 6, Blenderbell 615 accesses the list, chart, table, or the like associating hangout 620 identifier to new telephone number and matches the agent identifier to the hangout 620 identifier.

Step 1040: Send Endpoint Message Containing Identifier.

In step 1040, the endpoint is sent a message containing the session identifier and, thus, may connect to the multimedia communications session. Step 1040 may be accomplished using certain techniques described with respect to step 840 of FIG. 8. For example, Blenderbell 615 of FIG. 6 may instruct the messaging application 650 to send a message to the agent client device 640 that received the telephone call, the message containing the session identifier. Once the message is received by the agent client device 640, the agent client device 640 may connect to and participate in the hangout 620 associated with the session identifier. Thus, the agent client device 640 that received the telephone call placed in step 915 is connected to the hangout 620 that initiated the telephone call.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A contact center comprising:
a web server configured to receive a multimedia support request from a requesting client device and establish a multimedia communications session with the requesting client device at a particular address;
a first controller configured to generate a room identifier associated with the multimedia support request and instruct the web server to transmit an invitation to the requesting client device for the requesting client device to join the multimedia communications session at the particular address;
a second controller configured to instruct a telephony application to place a proxy telephone call, after the requesting client device accepts the invitation in association with the multimedia communications session, to a telephone exchange and, after the proxy telephone call has passed through a joint queue configured to accept proxy and non-proxy service telephone calls, route the proxy telephone call to an available agent client device;
a monitoring server configured to monitor the telephone exchange and report, to the first controller, routing of the proxy telephone call to the available agent client device, the first controller further configured to transmit a message including the room identifier to the available agent client device in response to the report from the monitoring server,
wherein the available agent client device is configured to connect to the multimedia communications session at the particular address, and
audio is exchanged between the requesting client device and the agent client device via at least one of the proxy telephone call and the multimedia communications session.

2. The contact center of claim 1, further comprising:
an automated contact center resource, associated with the multimedia communications session, configured to determine a specific skill necessary to resolve the multimedia support request;
a first table, at the first controller, associating a skill-specific telephone number with the specific skill; and
a second table, at the first controller, associating the room identifier with the skill-specific telephone number.

3. The contact center of claim 2, wherein:
the telephony application is configured to place the proxy telephone call, through the PSTN, to the skill-specific telephone number corresponding to the specific skill necessary to resolve the multimedia support request,
the monitoring server is configured to report an agent identifier, corresponding to the available agent client device, and the skill-specific telephone number to the first controller, and
the first controller is configured to transmit the message including the room identifier based on the second table.

4. The contact center of claim 2, wherein:
the specific skill is one of a plurality of skills associated with the contact center,
the skill-specific telephone number is one of a plurality of skill-specific telephone numbers, the first table associating each of the skill-specific telephone numbers with one of the skills associated with the contact center, and
the joint queue is one of a plurality of queues, each queue being associated with one of the skills associated with the contact center and configured to temporarily store calls for routing to available agent client devices.

5. The contact center of claim 2, wherein the automated contact center resource includes an interactive voice response unit.

6. The contact center of claim 1, further comprising:
a first table associating a new proxy identifier, generated by the first controller, with the room identifier,
wherein the telephony application is configured to place the proxy telephone call to the telephone exchange using the new proxy identifier.

7. The contact center of claim 6, wherein caller identification for the proxy telephone call is set to the new proxy identifier.

8. The contact center of claim 6, wherein the new proxy identifier is generated randomly.

9. The contact center of claim 6, wherein:
the telephony application is configured to place the proxy telephone call to the telephone exchange using the new proxy identifier as caller identification,
the monitoring server is configured to identify and report the new proxy identifier along with an agent identifier identifying the available agent client device to the first controller, and
the first controller is configured to associate the agent identifier to the room identifier using the first table.

10. A contact center supporting both web and telephone originating support requests comprising:
a telephone exchange configured to receive a plurality of customer telephone calls for support requests from requesting client telephone devices;
a web server configured to receive a plurality of multimedia support requests from requesting client data devices;
a first controller configured to generate a room identifier associated with each multimedia support request and instruct the web server to transmit an invitation to the requesting client data device associated with the multimedia support request, wherein a multimedia communications session at a particular address is established by the web server for each requesting client data device when the requesting client data device accepts the invitation;
a second controller configured to instruct a telephony application to place proxy telephone calls, as proxies for each multimedia communications session, to the same telephone exchange that receives customer telephone calls from client telephone devices, the proxy telephone call being received by the telephone exchange and being identifiable as associated with a particular multimedia session; and,
a joint queue configured to receive both the customer telephone calls and the proxy telephone calls, and after each of the customer and proxy telephone calls has passed through the queue, the telephone exchange configured to route and connect each of the customer and proxy telephone calls to an available agent client device.

11. The contact center of claim 10 further comprising:
a monitoring server configured to monitor the telephone exchange and report, to the first controller, connection of each proxy telephone call to an agent client device, the first controller configured to transmit a message including the room identifier to the agent client device in response to the report from the monitoring server,
wherein the agent client device is configured to connect to the multimedia communications session at the particular address via the message.

12. The contact center of claim 10 wherein each proxy telephone call includes information associating the proxy telephone call with its associated multimedia communications session.

13. A method at a multimedia contact center comprising:
receiving, from a client device, a multimedia support request via a first communications pathway;
generating a session identifier associated with the multimedia support request;
transmitting, to the client device, an invitation, including the session identifier, to participate in a multimedia communications session;
establishing the multimedia communications session at a particular address based on acceptance of the invitation;
instructing a telephony application associated with the multimedia communications session to place a proxy telephone call that is associated with the multimedia communications session;
receiving the proxy telephone call at a telephone exchange;
routing and connecting the proxy telephone call by the telephone exchange to an available endpoint after the proxy telephone call has passed through a queue with other calls, wherein the queue is configured to store both the proxy telephone call that is placed based on the multimedia support request received via the first communications pathway and telephone calls received at the multimedia contact center via a second communications pathway;
monitoring the telephone exchange to identify the available endpoint when the proxy telephone call is connected to the available endpoint; and
transmitting, to the available endpoint, a second invitation, including the session identifier, to participate in the multimedia communications session.

14. The method of claim 13, further comprising:
determining a specific skill necessary to resolve the multimedia support request;
determining a skill-specific telephone number associated with the multimedia contact center based on the specific skill;
associating the session identifier with the skill-specific telephone number;
placing the proxy telephone call, through the second communication pathway, to the skill-specific telephone number corresponding to the specific skill necessary to resolve the multimedia support request;
determining an endpoint identifier of the available endpoint connected to the proxy telephone call to the skill-specific telephone number; and
associating the session identifier with the endpoint identifier based on the skill-specific telephone number.

15. The method of claim 14, wherein:
the specific skill is one of a plurality of skills associated with the multimedia contact center,
the skill-specific telephone number is one of a plurality of skill-specific telephone numbers associated with the multimedia contact center, and
the queue is one of a plurality of queues, each queue being associated with one of the skills associated with the multimedia contact center and configured to temporarily store endpoint identifiers corresponding to available endpoints configured to resolve multimedia support requests.

16. The method of claim 13, further comprising:
associating a new caller identifier with the session identifier; and placing the proxy telephone call to the telephone exchange using the new caller identifier.

17. The method of claim 16, further comprising:
generating the new caller identifier by spoofing a known telephone number associated with the multimedia contact center.

18. The method of claim 16, further comprising:
generating the new caller identifier randomly.

19. The method of claim 16, further comprising:
placing the proxy telephone call, through the second communications pathway, to the telephone exchange using the new caller identifier;
identifying the new caller identifier when the proxy telephone call is received at the telephone exchange;
determining an endpoint identifier of the available endpoint when the proxy telephone call is connected to the available endpoint; and
associating the session identifier with the endpoint identifier based on the new caller identifier.

20. The method of claim 16, further comprising:
placing the proxy telephone call, through the first communications pathway, to the telephone exchange using the new caller identifier;
identifying the new caller identifier when the proxy telephone call is received at the telephone exchange;
determining an endpoint identifier of the available endpoint when the proxy telephone call is connected to the available endpoint; and
associating the session identifier with the endpoint identifier based on the new caller identifier.

* * * * *